United States Patent [19]

Hagino

[11] Patent Number: 5,122,867
[45] Date of Patent: Jun. 16, 1992

[54] VIDEO SIGNAL PROCESSING CIRCUIT HAVING A BAND PASS FILTER FOLLOWING A DELAY CIRCUIT IN A COMB FILTER ARRANGEMENT

[75] Inventor: Hideyuki Hagino, Fukaya, Japan

[73] Assignee: Kabushiki Kaisha Toshiba, Kawasaki, Japan

[21] Appl. No.: 586,219

[22] Filed: Sep. 21, 1990

[30] Foreign Application Priority Data

Sep. 27, 1989 [JP] Japan ................. 1-249075

[51] Int. Cl.$^5$ ............................................. H04N 9/78
[52] U.S. Cl. ............................... 358/31; 358/35
[58] Field of Search .......................... 358/31, 35

[56] References Cited

U.S. PATENT DOCUMENTS 3,872,498  3/1975  Pritchard .............. 358/30
4,050,084  9/1977  Rossi ..................... 358/31

FOREIGN PATENT DOCUMENTS 55-150688  11/1980  Japan .................... 358/31

*Primary Examiner*—James J. Groody
*Assistant Examiner*—Kim Yen Vu
*Attorney, Agent, or Firm*—Finnegan, Henderson, Farabow, Garrett and Dunner

[57] ABSTRACT

This invention discloses a video signal processing circuit of a comb filter arrangement for separating and extracting a luminance signal and a chrominance signal from an input video signal including the luminance signal and the chrominance signal. The input video signal is delayed by a delay circuit by a 1H period, and a 1H-delayed signal is supplied to a band-pass filter. The signal having passed through the band-pass filter is added to the original input video signal by an adding circuit. An output from the adding circuit is supplied to a trap circuit and chrominance signal components are eliminated. Meanwhile, the signal having passed through the band-pass filter is eliminated from the input video signal by a subtracting circuit, and an amplitude of an output from the subtracting circuit is attenuated by an attenuating circuit. A signal corresponding to a period corresponding to an amplitude difference in the chrominance signal between the signal having passed through the band-pass filter and the original input video signal before delay is generated by a switching signal generating circuit. A first switching circuit switches the outputs from the adding circuit and the trap circuit, and a second switching circuit switches the original input video signal and an output from the attenuating circuit.

5 Claims, 3 Drawing Sheets

VIDEO SIGNAL PROCESSING CIRCUIT HAVING A BAND PASS FILTER FOLLOWING A DELAY CIRCUIT IN A COMB FILTER ARRANGEMENT

BACKGROUND OF THE INVENTION

1. Field of the Invention

The present invention relates to a video signal processing circuit of a comb filter arrangement for separating and extracting a luminance signal and a chrominance signal from an input video signal including the luminance signal and the chrominance signal.

2. Description of the Related Art

A general video tape recorder (referred to as a VTR hereinafter) separates a luminance signal and a chrominance signal from an input video signal including the luminance and the chrominance signal to form an FM-converted luminance signal and low-frequency converted chrominance signal and records them on a magnetic tape. In a general television signal, when a signal has a high line correlation, a luminance signal is concentrated near a spectrum of $nf_H$, and the chrominance signal is concentrated near a spectrum of $(n+\frac{1}{2})f_H$. That is, the luminance signal and the chrominance signal are interleaved with each other by an $f_H/2$ frequency. The VTR fully utilizes this interleaving to separate a luminance signal from a chrominance signal by a comb filter using a delay element having a delay time $\tau_D (\tau_D = 1/f_H)$ corresponding to one horizontal (1H) period.

FIG. 1 shows a conventional video signal processing circuit for separating and extracting two types of signals from an input video signal. FIG. 2 shows signal waveforms of the main part of the circuit shown in FIG. 1. An input video signal A is simultaneously supplied to an adding circuit 32 and a subtracting circuit 33 in addition to a delay element 31. The delay element 31 delays the input video signal A including a luminance signal and a chrominance signal by a 1H period and outputs a 1H-delayed signal. This delayed output signal B is supplied to a band-pass filter (referred to as a BPF hereinafter) 34. The BPF 34 eliminates a DC component from the delayed output signal B from the delay element 31 to extract 1H-preceding chrominance signal C. The extracted 1H-preceding chrominance signal C is simultaneously supplied to the adding circuit 32 and the subtracting circuit 33. The adding circuit 32 extracts a luminance signal D by adding the original input video signal A and the 1H-preceding chrominance signal C. Meanwhile, the subtracting circuit 33 extracts chrominance signal E including a luminance signal by subtracting the 1H-preceding chrominance signal C from the original input video signal A. The chrominance signal E including the luminance signal is supplied to a BPF 35 and chrominance signal F is extracted by the BPF 35 from the chrominance signal E.

In the video signal processing circuit with such an arrangement, the output from the delay element 31 passes through the BPF 34. As a result, comb characteristics of the adding and subtracting circuits are limited to the band of the BPF 34, and the comb characteristics do not influence a low-frequency component of a luminance signal. Therefore, degradation of a vertical resolution can be prevented.

In the conventional circuit described above, however, since the signal delayed by the delay element 31 is added to or subtracted from the original input video signal, as shown in FIG. 2, chrominance signal components undesirably appear at a non-correlation portion of the luminance signal D. In addition, chrominance signal components undesirably appear at an achromatic portion in the chrominance signal F, or an amplitude of this portion of the chrominance signal is reduced into a half to be −6 dB, resulting in inconvenience. Particularly, in case of chrominance signal, upon Y/C separation in recording, if a color appears at an achromatic portion, since chrominance signal always pass through the comb filter circuit in a chrominance signal processing circuit of a VTR upon playback, a color appears at an achromatic portion. Therefore, a so-called color ghost appears to form an image having poor quality.

SUMMARY OF THE INVENTION

It is, therefore, an object of the present invention to provide a video signal processing circuit capable of reducing a color ghost and preventing a luminance signal from leaking into a chrominance signal while keeping degradation of a vertical resolution at a conventional level.

According to the present invention, there is provided a video signal processing circuit comprising delay means for receiving an input video signal including a luminance signal and a chrominance signal, and delaying the input video signal by a 1H period, a first band-pass filter for receiving an output from the delay means, subtracting means for subtracting an output from the first band-pass filter from the input video signal, attenuating means for attenuating an output from the subtracting means, adding means for adding the output from the first band-pass filter to the input video signal, signal eliminating means for eliminating a frequency component corresponding to the chrominance signal from an output from the adding means, switching signal generating means for generating as a switching signal a signal corresponding to a period corresponding to an amplitude difference in the chrominance signal between the input video signal delayed by a 1H period by the delay means and the input video signal before delay, first switching means for switching and outputting the outputs from the adding means and the signal eliminating means in response to the switching signal from the switching signal generating means, second switching means for switching and outputting the input video signal and an output from the attenuating means in response to the switching signal from the switching signal generating means, and a second band-pass filter for receiving an output from the second switching means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
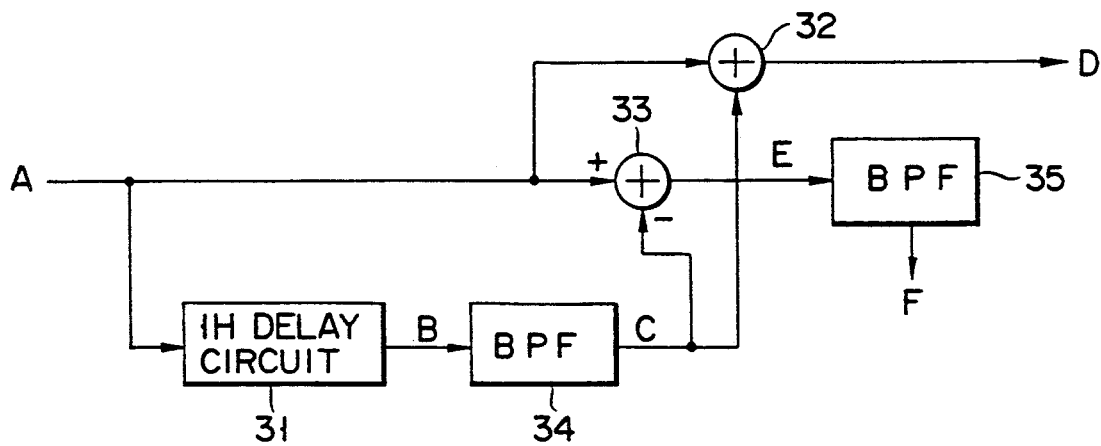
FIG. 1 is a block diagram of a conventional circuit.
Figure 2:
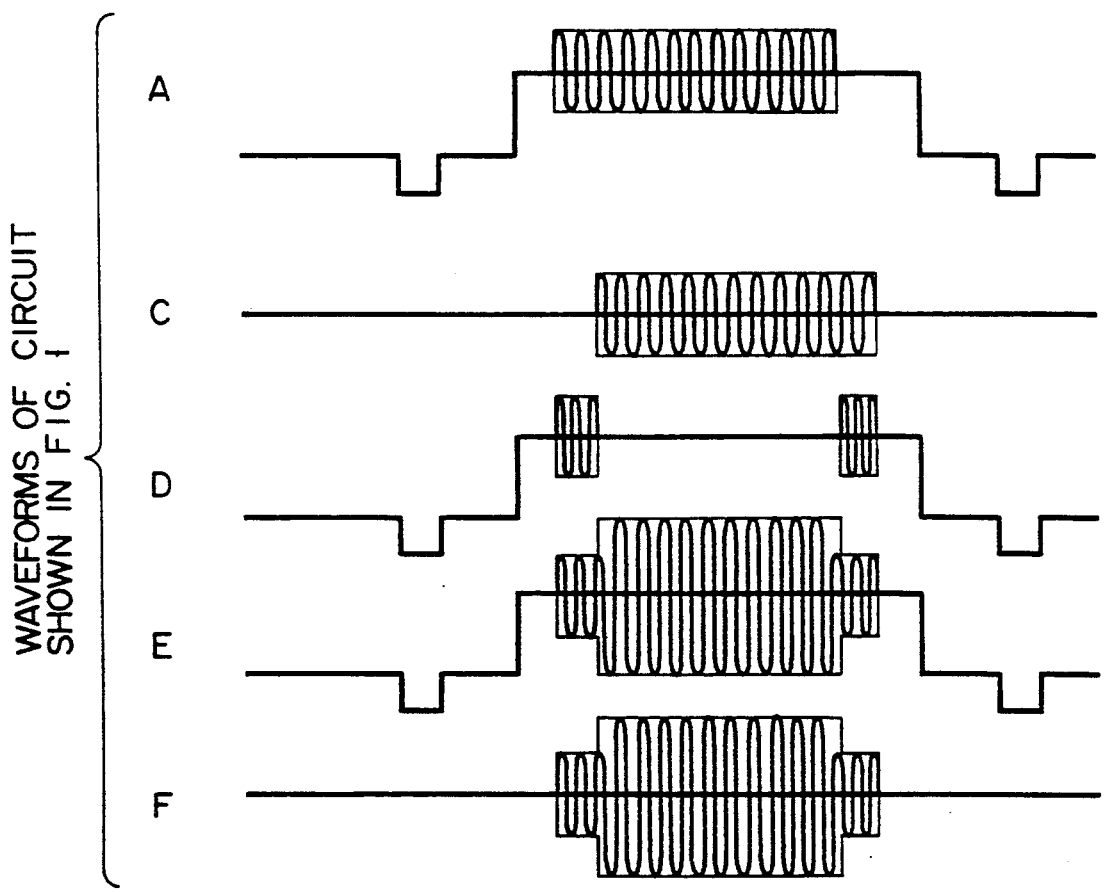
FIG. 2 is a timing chart showing waveforms of signals of the main part of the circuit shown in FIG. 3 is a block diagram showing an arrangement of a circuit of a embodiment according to the present invention.
Figure 3:
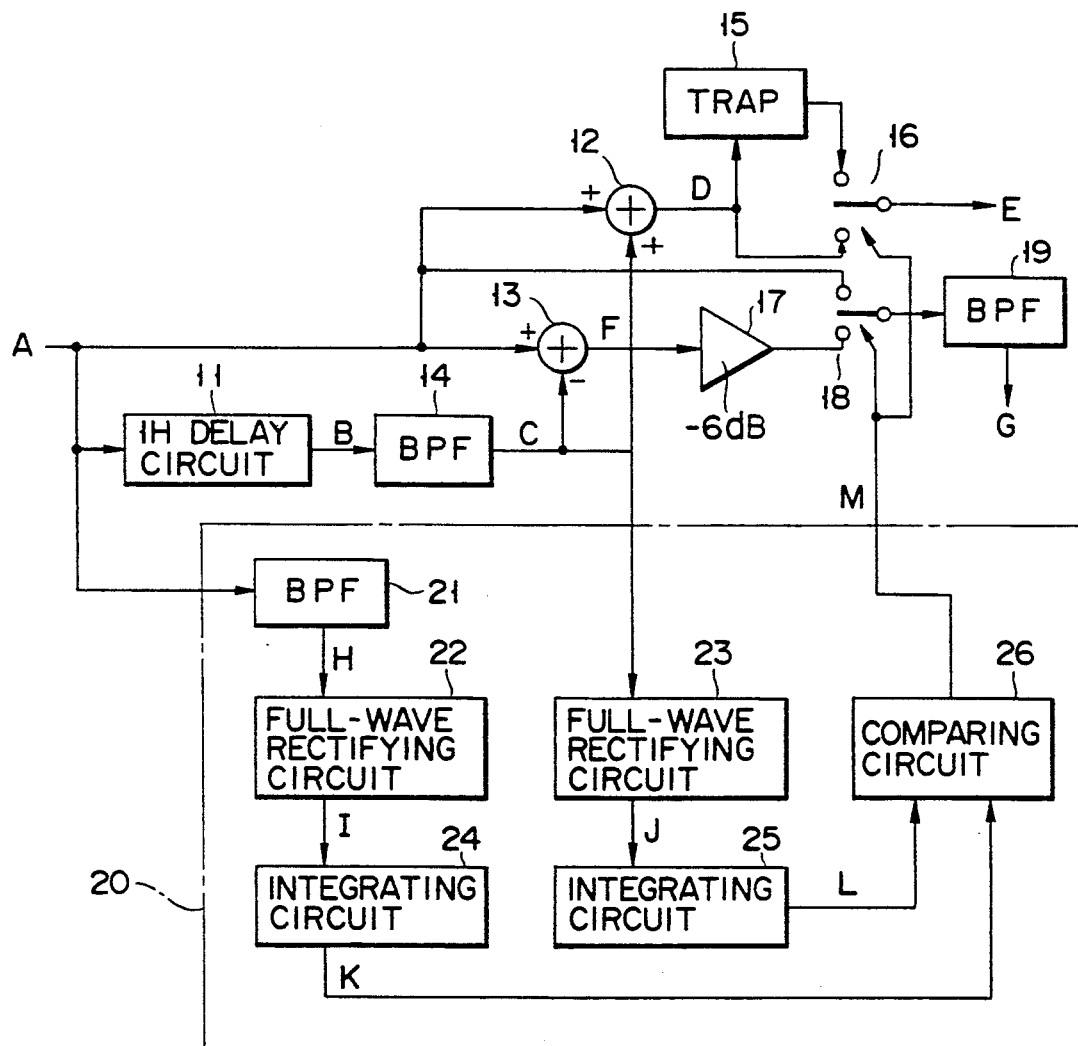

Referring to FIG. 3, an input video signal A is simultaneously supplied to an adding circuit 12 and a subtracting circuit 13 in addition to a delay element 11. The delay element 11 delays the input video signal A including a luminance signal and a chrominance signal by a 1H period and outputs a 1H-delayed signal. This delayed output signal B is supplied to a BPF (band-pass filter) 14. The BPF 14 eliminates a DC component from the delayed output signal B from the delay element 11 to extract 1H-preceding chrominance signal C. The extracted 1H-preceding chrominance signal C is simultaneously supplied to the adding circuit 12 and the subtracting circuit 13.

The adding circuit 12 generates a luminance signal D by adding the original input video signal A and the 1H-preceding chrominance signal C. The luminance signal D is simultaneously supplied to a trap circuit (TRAP) 15 and a first switching circuit 16. The trap circuit 15 eliminates chrominance signal components having a center frequency of, e.g., 3.58 MHz from the luminance signal D generated by the adding circuit 12. An output from the trap circuit 15 is supplied to the first switching circuit 16. The first switching circuit 16 outputs a luminance signal E by switching the two input signals in response to a switching signal M to be described later.

Meanwhile, the subtracting circuit 13 generates a chrominance signal F including a luminance signal by subtracting the 1H-preceding chrominance signal C from the original input video signal A. The chrominance signal F including the luminance signal is supplied to an attenuating circuit 17 for attenuating a signal by −6 dB and amplitudes of the chrominance signal F is attenuated into halves. An output signal from the attenuating circuit 17 and the original video input signal A are simultaneously supplied to a second switching circuit 18. The second switching circuit 18 switches and outputs the input signals in response to a switching signal M to be described later. An output from the second switching circuit 18 is supplied to a BPF 19, and chrominance signal G is extracted by the BPF 19.

On the other hand, referring to FIG. 3, reference numeral 20 denotes a switching signal generating circuit for generating the switching signal M used in the two switching circuits 16 and 18. As shown in FIG. 3, the circuit 20 is constituted by a BPF 21, full-wave rectifying circuits 22 and 23, integrating circuits 24 and 25, and a comparing circuit 26. The input video signal A is supplied to the BPF 21. As in the BPF 14, the BPF 21 eliminates a DC component from the input video signal A to supply an output signal H to the one full-wave rectifying circuit 22. In addition, the output signal C from the BPF 14 is supplied to the other full-wave rectifying circuit 23. The two full-wave rectifying circuits 22 and 23 full-wave rectify the output signals from the BPFs 14 and 21 and output rectified signals, respectively. Output signals I and J respectively output from the full-wave rectifying circuits 22 and 23 are supplied to the two integrating circuits 24 and 25, respectively. The two integrating circuits 24 and 25 respectively perform peak-to-peak integration of the outputs from the full-wave rectifying circuits 22 and 23 to obtain DC voltage signals. Integrated output signals K and L are supplied to the comparing circuit 26. The comparing circuit 26 generates the signal M of "H" level when a predetermined potential difference between the integrated output signals K and L from the integrating circuits 24 and 15 is obtained, or of "L" level when the predetermined potential difference is not obtained. That is, the switching signal generating circuit 20 generates as a switching signal M a signal corresponding to a period corresponding to the amplitude difference in the chrominance signal between the input video signal delayed by a 1H period by the delay element 11 and the input video signal before delay.

The operation of the circuit with this arrangement will be described with reference to a timing chart of waveforms shown in FIG. 4.

Figure 4:
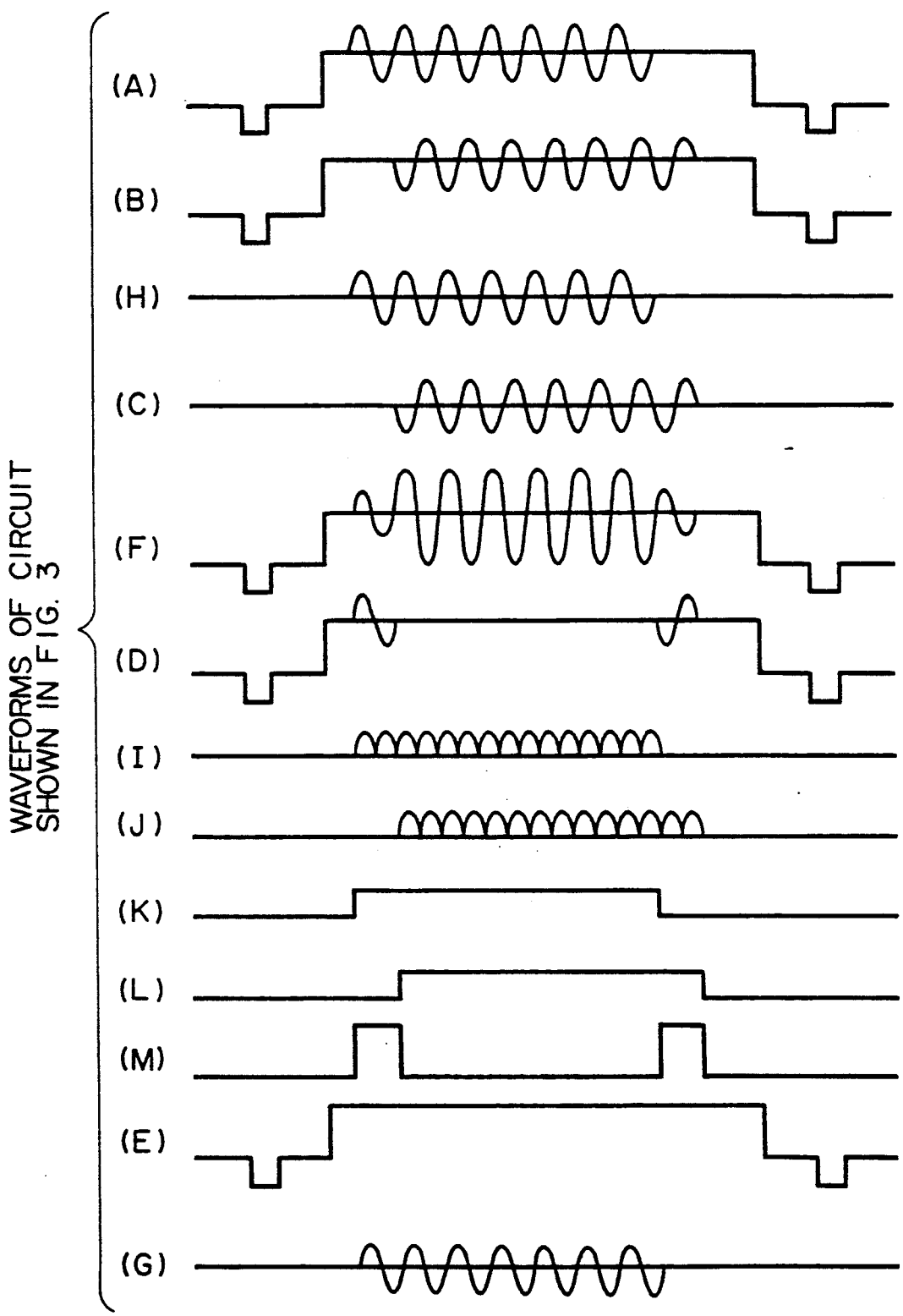
FIG. 4 is a timing chart showing waveforms of signals of the main part of the circuit shown in FIG. 3.

As shown in FIG. 4, when the input video signal A including a luminance signal and a chrominance signal is supplied to the delaying element 11, a signal B is output from the delay element 11. In the BPF 14 for receiving the signal B, a DC component is eliminated from the signal B, and the signal C including only chrominance signal components is output, as shown in FIG. 4. In the adding circuit 12, the signal C is added to the input video signal A. Phase of chrominance signal of the input video signal A is different from these of the 1H-preceding signal B by 180°. Therefore, in the output signal D from the adding circuit 12, there is no chrominance signal component at a portion where the chrominance signal components are included in both the corresponding portions of the signals A and B, and there are chrominance signal components at positions where only one of the corresponding portions of the signals A and B includes the chrominance signal components.

Meanwhile, since the output signal C from the BPF 14 is also supplied to the subtracting circuit 13, the signal C is subtracted from the input video signal A by the subtracting circuit 13. In the output signal F from the subtracting circuit 13, there are chrominance signal components each having an amplitude twice the original amplitude at a portion where the chrominance signal components are included in both the signals A and B, and there are chrominance signal components each having the original amplitude at a portion where only one of the signals A and B includes chrominance signal components. An output signal from the subtracting circuit 13 is attenuated by the attenuating circuit 17 to be a signal having an amplitude half the original amplitude.

Meanwhile, in the switching signal generating circuit 20, as shown in FIG. 4, a signal H including only chrominance signal components is output from the BPF 21 to which the input video signal A is supplied. In the full-wave rectifying circuits 22 and 23 for respectively receiving the signal H and the output signal C from the BPF 14, the input signals are respectively full-wave rectified, and the signals I and H as shown in FIG. 4 are respectively output. Both the output signals I and J are respectively integrated by the integrating circuits 24 and 25 to output signal potentials K and L as shown in FIG. 4. The comparing circuit 26 generates the switching signal M of "H" level when a predetermined potential difference between the outputs from the integrating circuits 24 and 25 is obtained, and of "L" level when the predetermined potential difference is not obtained.

In the first switching circuit 16, when the switching signal M is at "L" level, the output from the adding circuit 12 is selected, and when the switching signal M is at "H" level, the output from the trap circuit 15 is selected. As a result, when the signal D (output signal from the adding circuit 12) shown in FIG. 4 does not include chrominance signal components, the signal D is selected. When the signal D includes chrominance signal components, the signal D having passed through the trap circuit 15 to eliminate the chrominance signal components is selected. Therefore, a luminance signal E without chrominance signal components is output from the first switching circuit 16.

In the second switching circuit 18, when the switching signal M is at "L" level, the output from the attenuating circuit 17 is selected, and when the signal M is at "H" level, the input video signal A is selected. As a result, a signal including chrominance signal components having the original amplitude at the same portion as the original input video signal A is output from the second switching circuit 18. A DC component is eliminated from the output signal from the second switching circuit 18 by passing this output signal through the BPF 19. Therefore, chrominance signal G always have a predetermined amplitude, and never include chrominance signal components at the achromatic portion.

As described above, in the circuit of this embodiment, since the output from the delay element basically passes through the BPF, degradation of a vertical resolution can be kept at the conventional level. In addition, according to the circuit of this embodiment, chrominance signal components never appear at the achromatic portion, and the amplitudes of the chrominance signal of this portion are never reduced into a half to be −6 dB. As a result, upon Y/C separation in recording, no color appears at an achromatic portion. Therefore, in playback, when chrominance signal pass through a comb filter circuit in chrominance signal processing circuit of a VTR, no color appears at an achromatic portion. As a result, a so-called color ghost can be prevented.

The present invention is not limited to the above embodiment, and it is obvious that the various modifications can be made. For example, in the above embodiment, the switching signal generating circuit 20 is arranged as shown in FIG. 3. However, another circuit having a function of generating as a switching signal a signal corresponding to a period corresponding to an amplitude difference in the chrominance signal between the input video signal delayed by a 1H period by the delay element and the input video signal before delay may be used.

As described above, according to the present invention, a color ghost can be reduced and a luminance signal can be prevented from leaking into a chrominance signal while the degradation of the vertical resolution is kept at the conventional level.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A video signal processing circuit comprising:
   delay means for receiving an input video signal including a luminance signal and a chrominance signal to delay said input video signal by a one-horizontal period;
   a first band-pass filter for receiving an output from said delay means;
   subtracting means for subtracting an output from said first band-pass filter from said input video signal;
   attenuating means for attenuating an output from said subtracting means;
   adding means for adding said output from said first band-pass filter to said input video signal;
   signal eliminating means for eliminating a frequency component corresponding to said chrominance signal from an output from said adding means;
   switching signal generating means for generating as a switching signal a signal corresponding to a period corresponding to an amplitude difference in said chrominance signal between said input video signal delayed by one horizontal period by said delay means and said input video signal before delay;
   first switching means for switching and outputting outputs from said adding means and said signal eliminating means in response to said switching signal from said switching signal generating means;
   second switching means for switching and outputting said input video signal and an output from said attenuating means in response to said switching signal from said switching signal generating means; and
   a second band-pass filter for receiving an output from said second switching means.

2. A circuit according to claim 1, wherein said attenuating means is a signal attenuating circuit for attenuating and outputting a signal having an amplitude half that of the output from said subtracting means.

3. A circuit according to claim 1, wherein said switching signal generating means comprises:
   a third band-pass filter for receiving said input video signal;
   first rectifying means for rectifying said output from said first band-pass filter;
   second rectifying means for rectifying an output from said third band-pass filter;
   first integrating means for integrating an output from said first rectifying means;
   second integrating means for integrating an output from said second rectifying means; and
   comparing means for receiving outputs from said first integrating means and said second integrating means, and for generating a signal corresponding to a period during which a predetermined potential is obtained from only one of the outputs from said first and second integrating means.

4. A circuit according to claim 3, wherein said first rectifying means and said second rectifying means are respectively constituted by full-wave rectifying circuits.

5. A video signal processing circuit comprising:
   delay means for receiving an input video signal including a luminance signal and a chrominance signal to delay said input video signal by a one-horizontal period;
   a first band-pass filter for receiving an output from said delay means;
   subtracting means for subtracting an output from said first band-pass filter from said input video signal;

attenuating means for attenuating an output from said subtracting means;
adding means for adding said output from said first band-pass filter to said input video signal;
signal eliminating means for eliminating a frequency component corresponding to said chrominance signal from an output from said adding means;
a second band-pass filter for receiving said input video signal;
first rectifying means for rectifying an output from said second band-pass filter;
second rectifying means for rectifying said output from said first band-pass filter;
first integrating means for integrating an output from said first rectifying means;
second integrating means for integrating an output from said second rectifying means;
comparing means for receiving outputs from said first integrating means and said second integrating means, and for generating a signal corresponding to a period during which a predetermined potential is obtained from only one of said outputs from said first integrating means and said second integrating means;
first switching means for switching and outputting outputs from said adding means and said signal eliminating means in response to an output from said comparing means;
second switching means for switching and outputting said input video signal and an output from said attenuating means in response to said output from said comparing means; and
a third band-pass filter for receiving an output from said second switching means.

* * * * *